Dec. 17, 1946. F. S. CRANE 2,412,875
WELL PIPE SCREWING DEVICE
Filed Sept. 19, 1944 2 Sheets-Sheet 1
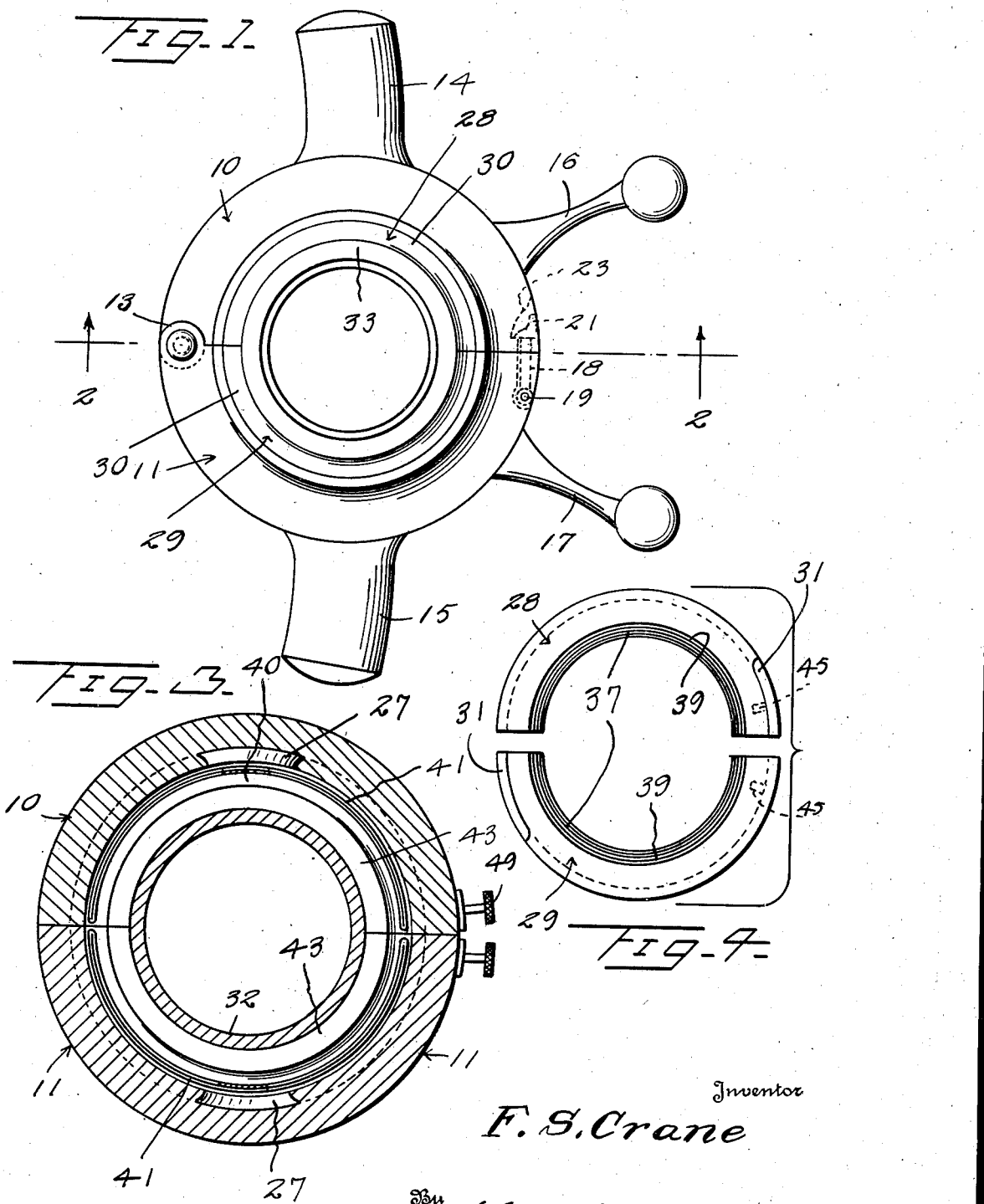
Inventor
F. S. Crane
By Kimmel & Crowell
Attorneys

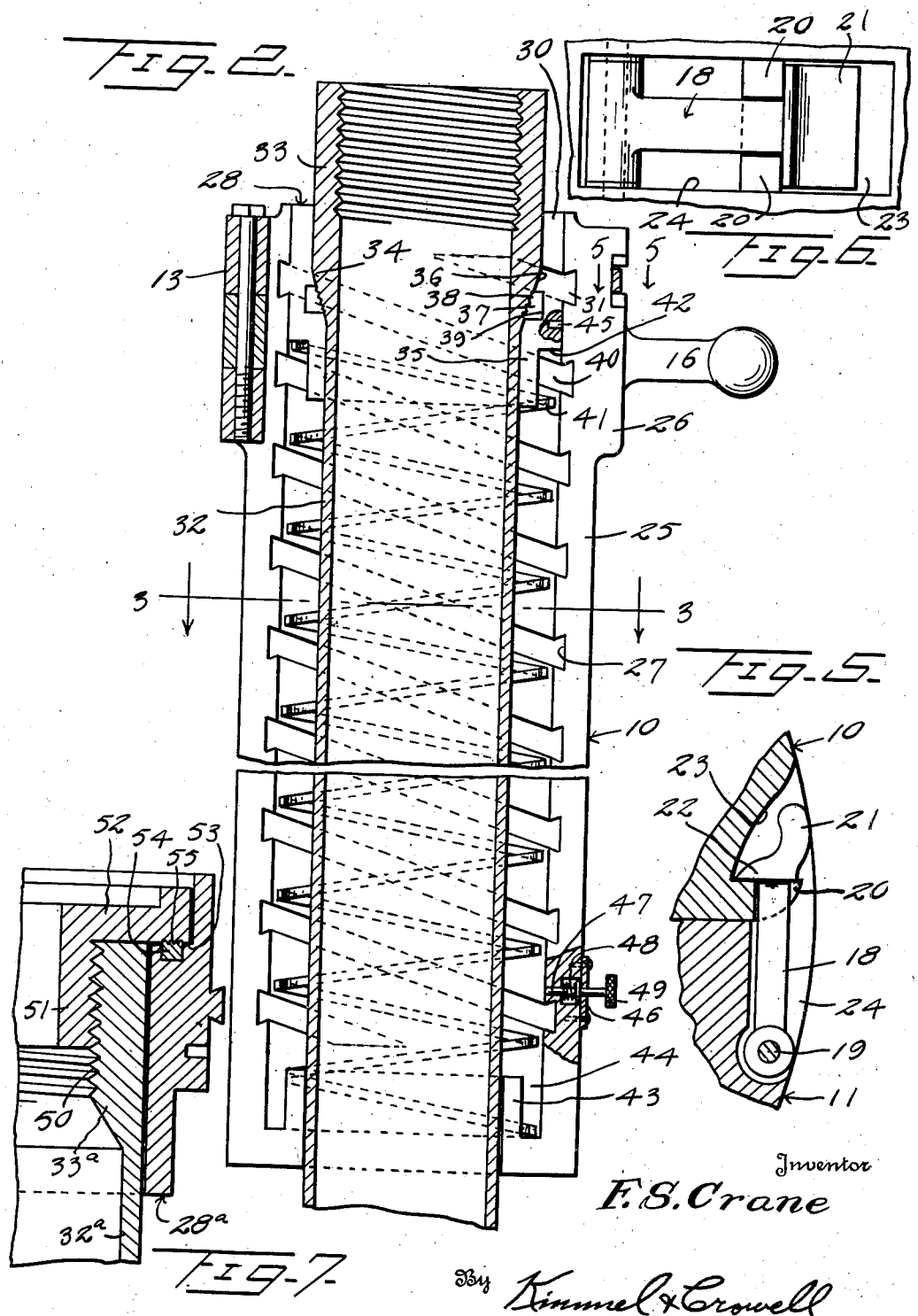

Patented Dec. 17, 1946

2,412,875

UNITED STATES PATENT OFFICE 2,412,875

WELL PIPE SCREWING DEVICE

Franklin S. Crane, Montrose, Calif.

Application September 19, 1944, Serial No. 554,803

2 Claims. (Cl. 255—35)

This invention relates to well pipes and more particularly to a means for initially threading or screwing one pipe into another.

In the assembly of a well pipe the pipe sections are threaded or screwed one into another by elevating one section and while this section is in a vertical position appropriate means is engaged with the lower portion of the pipe section so as to rotate the same. It is, therefore, an object of this invention to provide a combined elevating collar and rotating means for the pipe so that the pipe may be lifted by the elevator, lowered to engagement with the upper end of the preceding pipe, and at this time the rotating means is set into operation by upward pull so as to thread or screw the elevated pipe into the preceding pipe.

Another object of this invention is to provide a pipe rotating means in combination with an elevating means, such as a sleeve or collar, which will automatically rotate the pipe when an upward pull is placed on the pipe.

A further object of this invention is to provide an improved elevating sleeve or collar which is of split construction and which includes semicircular pipe rotating members which are spring urged to an upper operative position, the collar and pipe rotating members having threads whereby endwise movement of the collar will effect rotary and endwise movement of the pipe rotating members.

A further object of this invention is to provide in a device of this kind an improved thread which will hold the split pipe rotating members within the halves of the collar so that the pipe rotating members will not drop out when the collar is opened.

A further object of this invention is to provide an improved gripping means for gripping the pipe so that the latter may be held against turning relative to the rotating members.

A further object of this invention is to provide a spring-pressed lock for each pipe rotating member which is adapted to be manually moved to locking position, the lock being held in locking position by the return spring for the rotating members, each lock being spring-urged to released position so that when pipe is initially encircled by the collar upward pull on the collar will effect release of the lock and when the pipe is lowered to its coupling position the collar may be lowered for a distance about equal to the length of the collar whereupon the return springs will move the rotating members upwardly to their operative position so that upon subsequent elevation of the collar the pipe will be rotated and threaded into the preceding pipe.

The invention consists of the novel construction, combination and arrangement of parts as will be more specifically referred to, and illustrated in the accompanying drawings wherein are shown embodiments of the invention, but it is to be understood that changes, variations and modifications may be resorted to which fall within the scope of the invention, as claimed.

In the drawings:

Figure 1 is a detail top plan of a combined elevating sleeve and well pipe rotating device constructed according to an embodiment of this invention.

Figure 2 is a sectional view taken on the line 2—2 of Figure 1.

Figure 3 is a sectional view taken on the line 3—3 of Figure 2.

Figure 4 is an end elevation of the pipe rotating elements removed from the elevating sleeve or collar.

Figure 5 is a sectional view taken substantially on the line 5—5 of Figure 2.

Figure 6 is a fragmentary front elevation of the collar latching means.

Figure 7 is a fragmentary vertical section of a modified form of this invention.

Referring to the drawings, the numerals 10 and 11 designate generally a pair of complementary collar or elevating sleeve members which are of semi-cylindrical configuration and are hingedly connected together by hinge means 13. The collar section 10 is provided with an outwardly extending arm 14, the collar section 11 being provided with an arm 15, these arms providing a means for receiving a clevis or the like for attachment to an elevating cable.

The collar section 10 is also provided with a handle 16 and collar section 11 is provided with a handle 17 so that the two sections may be swung on the hinge 13 to either open or close these sections. A latch structure, comprising a bolt 18 pivotally mounted on a pivot 19 carried by collar section 11, is adapted to engage between a pair of keepers 20 carried by collar section 10, and the latch 18 includes a handle 21, handle 21 with the keeper engaging member 22 being adapted to be countersunk in a recess 23 formed in the collar section 10. Collar section 11 is also formed with a recess 24 within which the shank of the latch is adapted to engage so that when the latch 18 is in locked position no portion thereof will project from either of the collar sections.

The collar sections 10 and 11 are of like construction, and each includes a semi-cylindrical elongated body 25, which is formed at its upper end with an enlargement or collar 26. The interior of the body 25 is formed with a thread 27, which, in the present instance, is of dovetail configuration, the purpose for which will be hereinafter described.

The thread 27 is of long pitch, and may be either double or greater so that the pipe rotating elements, to be hereinafter described, will be rotated upon endwise movement of the collar sections.

The collar or sleeve formed by the sections 10 and 11 has rotatably mounted therein a pair of pipe rotating members 28 and 29 which are of like configuration. The pipe rotating member 28 includes a semi-cylindrical body 30 which is formed on the outer side thereof with a spiral rib or thread 31 having a dovetail configuration in transverse section for engagement in the female thread 27. By providing a dovetail thread construction the pipe rotating members 28 and 29 will not drop out of the hollow members or sections when these sections are swung outwardly to released position.

The well pipe 32 is adapted to loosely engage within the pipe rotating members 28 and 29 and the pipe 32, at its upper end, is formed with an enlarged coupling collar 33 which forms, at its lower end, a beveled shoulder 34. The body 30 of the rotating member 28, is formed with an inwardly offset semi-cylindrical lower part 35 and with a tapered intermediate part 36, the taper of which is similar to the taper or shoulder 34 of the pipe 32.

A semi-annular pipe gripping member 37, which is formed with inner serrations or teeth 38, is seated in a recess 39 formed in the tapered portion 36 of the body 30. The semi-cylindrical skirt or lower extension 35 has an outer diameter less than the inner diameter of the body 25 so as to thereby form a space 40 within which a serpentine spring 41 is adapted to engage, the upper end of the spring 41 engaging against a shoulder 42 formed at the lower end of the body 30. The spring 41 is preferably of the flat type so that when this spring is compressed it will occupy a minimum of space. There are two of these springs, one for each section 10 and 11, and each spring is semi-circular in end elevation, as shown in Figure 3. The lower end of the spring 41 engages between a semi-cylindrical collar or stop member 43 which is carried by a lower end of the body 25, there being thereby formed a space 44 within which the lower end of the spring 41 loosely engages. The semi-cylindrical collar 43 forms, in addition to a guide for the lower end of the body 25, a stop for the pipe rotating member 28 when the latter is in its lowermost position.

The pipe rotating member 28 is formed in the outer side thereof, with a recess or socket 45 within which the inner end of a locking pin 47 is adapted to engage. There are two of these pins 47, one for each collar section 10 and 11, and the pin 47 is urged outwardly to a released position by means of a spring 48. A knob 49 is carried by the outer end of the pin 47, so that this pin may be manually pushed inwardly within the recess or socket 45 so as to thereby hold the pipe rotating member 28 in its lowermost inoperative position. The plate 46 is secured to the outer side of the collar 10 and through which the pin 47 slidably engages.

In the use and operation of this device the arms 14 and 15 will have mounted thereon a clevis or other means secured to an elevating cable for raising the pipe.

The collar sections 10 and 11 are opened by moving the latch 18 to released position, and the collar sections then positioned about the pipe 32 below the coupling member 33. After the device has been once used the pipe rotating members 28 and 29 will normally be in their lowermost inoperative position being held by the stop pins 47. Spring 41 is of such tension as to provide a shearing force which will retain the stop pin 47 in its locked position against the tension of the spring 48.

When the collar has been encircled about the pipe the pipe may be initially raised and positioned vertically over the upper end of a preceding pipe. The weight of the pipe 32 will compress the springs 41 slightly so that springs 48 will move the locking members 47 to their released position. The collar sections may then be lowered about the pipe 32 for a distance substantially equal to the lengths of these collar sections thereby permitting the springs 41 to move the gripping members 29 and 30 upwardly to their uppermost operative position. This is the position shown in Figure 2. The assembled and locked collar may then be raised upwardly bringing the gripping members 37 into engagement with the lower end of the coupling member 33. Further upward movement of the collar will cause pipe rotating members 28 and 29 in their gripped position to rotate pipe 32. As pipe 32 rotates the lower end thereof will be screwed or threaded into the upper end of a preceding pipe, it being understood that the pipe 32 is of very substantial weight so that elevating of the collar will not, at the same time, elevate the pipe.

When the rotating members 28 and 29 are in their lowermost position the locking pins 47 may be pushed inwardly and the pipe may be finally tightened or screwed into the lower or preceding pipe by well known means. This latter operation will require only a fragmentary turning of the pipe 32 whereas previously the pipe 32 has required complete rotation for the length of the threads in the coupling.

With this device the greater portion of the rotation is effected without the use of the prior pipe screwing or threading tools.

Referring now to Figure 7, there is disclosed a modified form of this invention adapted for use with an internally upset pipe. Pipe section 32ª is formed with an internally upset end portion 33ª which is internally threaded as at 50 and a tubular plug 51 is threaded into pipe section 32ª. Plug 51 is formed with an annular flange 52 which is larger in diameter than the outer diameter of pipe section 32ª so as to project outwardly thereof.

A semi-cylindrical pipe rotating member 28ª engages about the pipe section 32ª and the upper end of rotating member 28ª is formed with a shoulder 53 which underlies the outer portion of flange 52. A semi-circular hardened member 54 which is formed with serrations 55 in the upper side thereof is countersunk in shoulder 53 and the serrations 55 are adapted to bite into flange 52 when rotating member 28ª is raised to operative position. It will be understood that there are two rotating members 28ª of like construction and the remaining details of construction thereof are similar to rotating members 28 and 29, and that the two rotating members 28ª will be mounted in collar sections 10 and 11.

I claim:

1. A combined pipe elevating and screwing collar comprising a lengthwise split cylindrical member adapted to encircle a pipe, means hingedly coupling the split sections of said member together, female dovetailed threads on the inside surface of each section, a pair of semi-cylindrical pipe rotating members within said first member, exterior dovetailed threads carried by said pipe rotating members adapted to engage said female threads, pipe gripping means carried by said pipe rotating members, a pair of semi-cylindrical springs seated within the collar and forcing said pipe rotating members longitudinally toward the upper end of said collar constantly maintaining said gripping means in pipe gripping position, and spring pressed locking means for locking said pipe rotating members at the lower end of said first member.

2. A combined pipe elevating and screwing collar comprising a lengthwise split cylindrical member adapted to loosely encircle a well-pipe, a split pipe rotating element within said collar, semi-cylindrical spring means seated within the collar and forcing said pipe rotating members longitudinally toward the upper end of said collar for holding said rotating element in pipe gripping position, correlated dovetailed threads carried by said collar and said element for rotating said element upon endwise movement of said collar, and spring pressed means for locking said pipe rotating element at the lower end of said collar and in register with the split sections of said collar, whereby said collar, said elements and said springs may be positioned or removed lengthwise of said well pipe.

FRANKLIN S. CRANE.